United States Patent
Ong et al.

(10) Patent No.: US 7,353,377 B2
(45) Date of Patent: Apr. 1, 2008

(54) REMOTELY PROVIDING BASIC INPUT/OUTPUT SYSTEM TO A CLIENT SYSTEM

(75) Inventors: Soo Keong Ong, Penang (MY); Hai Ming Khor, Penang (MY); Yoeng Haur Phuah, Penang (MY); Wei Kee Law, Negeri Sembilan (MY)

(73) Assignee: Intel Corporation, Santa Clara, CA (US)

( * ) Notice: Subject to any disclaimer, the term of this patent is extended or adjusted under 35 U.S.C. 154(b) by 477 days.

(21) Appl. No.: 10/939,215

(22) Filed: Sep. 10, 2004

(65) Prior Publication Data

US 2006/0059330 A1 Mar. 16, 2006

(51) Int. Cl.
G06F 9/00 (2006.01)
G06F 15/16 (2006.01)
G06F 9/44 (2006.01)

(52) U.S. Cl. ............................ 713/2; 709/217; 717/168
(58) Field of Classification Search ............... 713/2, 713/1; 709/217; 365/185.04; 717/168
See application file for complete search history.

(56) References Cited

U.S. PATENT DOCUMENTS

| 5,230,052 | A | | 7/1993 | Dayan et al. ............... 395/700 |
|---|---|---|---|---|
| 5,379,342 | A | * | 1/1995 | Arnold et al. .................. 380/2 |
| 5,579,522 | A | * | 11/1996 | Christeson et al. ............ 713/2 |
| 5,805,882 | A | * | 9/1998 | Cooper et al. ................. 713/2 |
| 5,835,760 | A | * | 11/1998 | Harmer ......................... 713/2 |
| 5,987,536 | A | * | 11/1999 | Johnson et al. ............... 710/36 |
| 6,188,602 | B1 | * | 2/2001 | Alexander et al. ..... 365/185.04 |
| 6,282,643 | B1 | * | 8/2001 | Cromer et al. ................. 713/2 |
| 6,487,464 | B1 | | 11/2002 | Martinez et al. ............. 700/79 |
| 6,816,963 | B1 | | 11/2004 | Krithivas et al. ............. 713/1 |
| 7,178,019 | B2 | * | 2/2007 | Lam .............................. 713/2 |
| 7,234,050 | B2 | * | 6/2007 | Agan et al. .................... 713/1 |
| 7,269,829 | B2 | * | 9/2007 | Smith et al. ................ 717/168 |
| 2003/0177345 | A1 | * | 9/2003 | Huang .......................... 713/2 |
| 2006/0020837 | A1 | * | 1/2006 | Rothman et al. .......... 713/310 |

FOREIGN PATENT DOCUMENTS

| EP | 479427 A2 | * | 4/1992 |
|---|---|---|---|
| JP | 04263349 A | * | 9/1992 |
| JP | 2000148465 A | * | 5/2000 |

\* cited by examiner

*Primary Examiner*—Suresh K Suryawanshi
(74) *Attorney, Agent, or Firm*—Trop, Pruner & Hu, P.C.

(57) ABSTRACT

In one embodiment, the present invention includes a method of initializing a system without a basic input/output system (BIOS) to vector to a memory dedicated to a network controller, requesting the BIOS from a remote source using code stored in the memory, and storing the BIOS in a volatile memory of the system.

15 Claims, 2 Drawing Sheets

REMOTELY PROVIDING BASIC INPUT/OUTPUT SYSTEM TO A CLIENT SYSTEM

BACKGROUND

The present invention relates generally to operation of processor-based systems, and more particularly to initialization and operation of client systems.

Initialization of processor-based systems generally involves using a basic input/output system (BIOS) which is stored in a read only memory (ROM), such as a flash ROM generally attached to a system motherboard, and is transferred to system memory during the boot process. BIOS refers to both basic bootstrap firmware as well as code to permit low-level operations in the system, such as an interface between an operating system (OS) and hardware components of the system. Once written and installed in a system, the BIOS is generally fixed, immutable and predefined. As a result, the BIOS must account for a large number of processor, chipset, memory, and peripheral devices, but this large number is necessarily finite. Accordingly, the BIOS is limited in the hardware which it may support by a number of factors, including the available memory or storage, the amount of effort put into compiling the BIOS, and the availability of components at the time the BIOS was developed.

Thus, as a system evolves, the BIOS remains basically static. This means that the BIOS may be unable to completely adapt to a variety of changed circumstances. In addition, the availability of improved and updated capabilities may not readily be incorporated into the BIOS. Furthermore, the BIOS has a size limitation due to the storage capacity of the flash ROM or other ROM device on which it is stored. Similarly, memory device failure is a concern, as the memory's content may be corrupted due to power interruption or other failure. While a BIOS update to a memory device may occur, such operation is time consuming and requires manual support. Although a BIOS can be updated at the OS level, for the new and/or updated settings and/or features to take effect, a restart is necessary to execute the new BIOS.

The convergence of communications and computing is driving high availability computing. Such high availability computing is needed in networks such as a telecommunications network. In such a network, it is common to find multiple BIOS revisions used on different boards (e.g., of network servers) of the same type. This is because BIOS updates are done manually, and if a BIOS of a given server does not have the update, the server will boot up with the old BIOS. A need thus exists to improve efficiency and configurability of BIOS.

DETAILED DESCRIPTION

In various embodiments, a client system may be tested, initialized and set up remotely through a network. In such manner, activities normally performed by a BIOS, including initialization, may be effected without an on-board BIOS. As used herein, the term "on-board BIOS" refers to a BIOS image fixed in a non-volatile memory, such as a flash memory or other read only memory (ROM) of the system (i.e., on the motherboard).

Figure 1:
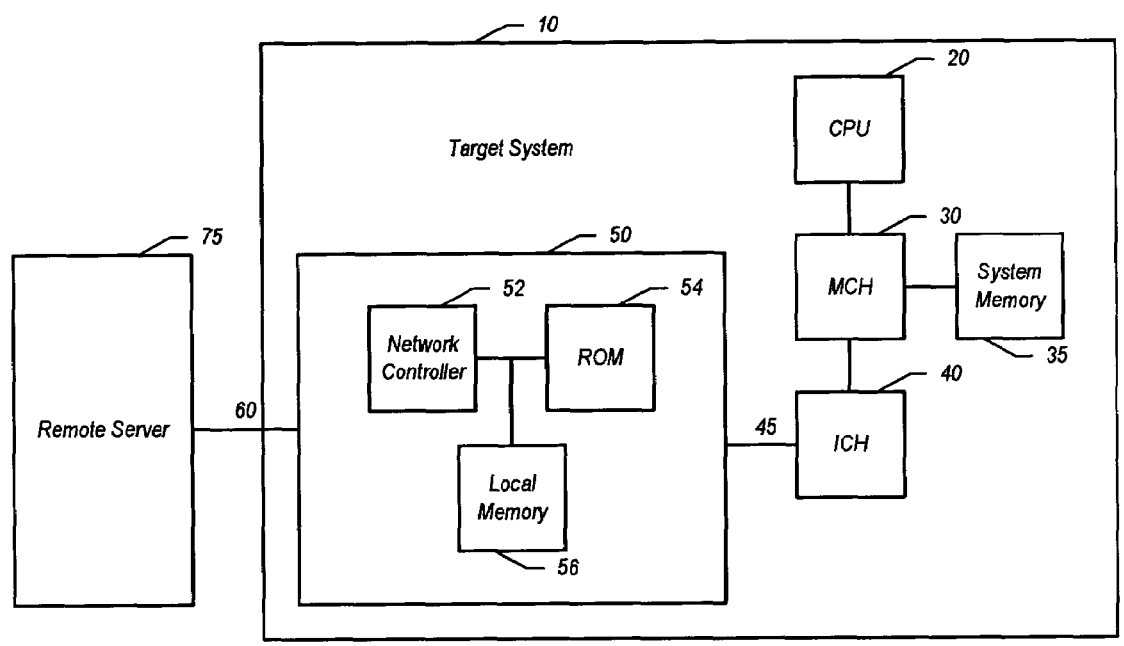
FIG. 1 is block diagram of a system in accordance with one embodiment of the present invention.

Referring now to FIG. 1, shown is a block diagram of a system in accordance with one embodiment of the present invention. As shown in FIG. 1, the system may include a target system 10, which may be a personal computer (PC) such as a desktop computer, notebook computer, server computer or the like. Alternately, target system 10 may be any desired processor-based system, such as a set-top box, blade server, personal digital assistant (PDA) or the like.

As shown in FIG. 1, target system 10 may be coupled to a remote server 75 via a network connection 60. For example, network connection 60 may be a copper link, such as a category 5 (CAT 5) or other such cable device, optical fiber or the like. While the type of network connection may vary, in certain embodiments, connection 60 may be a Ethernet connection that communicates with remote server 75. Ethernet is often used to refer to carrier sense multiple access/collision detection (CSMA/CD) local area networks (LANs) that generally conform to Ethernet specifications, including the Institute of Electrical and Electronic Engineers (IEEE) 802.3 standard (published Jul. 29, 1996).

Communication between target system 10 and remote server 75 may be effected via a connection-less protocol, such as User Datagram Format (UDP), although the scope of the present invention is not so limited. In other embodiments, connection 60 may be a wireless connection, such as a wireless local area network (WLAN) in conformance with the IEEE 802.11b standard, IEEE std. 802.11b-1999 (published Sep. 16, 1999) (also known as "WiFi"), IEEE std. 802.11a-1999 (published Sep. 16, 1999), or IEEE std. 802.11g (published April 2003), or a BLUETOOTH™ or other such connection.

As shown in FIG. 1, target system 10 may include a processor 20, such as a central processing unit (CPU). Processor 20 may be coupled to a memory controller hub (MCH) 30 which in turn may be coupled to a system memory 35. In one embodiment, system memory 35 may be a dynamic random access memory (DRAM) formed of dual inline memory modules (DIMMs), while in other embodiments system memory may be, for example, a static RAM (SRAM). MCH 30 may also be coupled to an input/output controller hub (ICH) 40.

ICH 40 may in turn be coupled to a peripheral device 50 via a peripheral bus 45. For example, peripheral device 50 may be a peripheral component interconnect (PCI) card or another peripheral device coupled to peripheral bus 45. Peripheral bus 45 may take different forms in different embodiments. For example, peripheral bus 45 may be a Peripheral Component Interconnect (PCI) bus in accordance with the PCI Local Bus Specification, Rev. 3.0 (published Feb. 3, 2004), a PCI Express™ bus in accordance with the PCI Express Base Specification, Rev. 1.0a (published Apr. 15, 2003), or a PCI-X bus in accordance with the PCI-X Specification, version 2.0 (published Jul. 22, 2002), although the scope of the present invention is not so limited.

In one embodiment, peripheral device 50 may be an add-on card, although the scope of the present invention is not so limited. For example, peripheral device 50 may be a network interface card (NIC) and may include a network controller 52, such as a local area network (LAN) controller, which may be coupled to an expansion read only memory (ROM) 54 and a local memory 56. In one embodiment, expansion ROM 54 may be a memory in accordance with the PCI Local Bus Specification Revision 3.0 (Feb. 3, 2004). Local memory 56 may be a volatile memory, such as a semiconductor memory, for example, a DRAM or SRAM, although the scope of the present invention is not so limited. While shown as being coupled to ICH 40, in other embodiments, peripheral device 50 may be coupled to MCH 30, for example, if there is an appropriate link thereon (e.g., a PCI, PCI-X, or PCI-Express™ link).

While shown in FIG. 1 as including these different components, it is to be understood that in other embodiments, the functionality provided by the network controller and memories may be effected in different configurations. For example, while FIG. 1 shows a single network controller, in other embodiments an additional add-on controller may be provided to interface with a network controller lacking the functionality described herein. That is, where a network controller (e.g., a legacy controller) does not include such functionality, an add-on controller may be provided to work with the legacy controller so that the combination of the add-on controller and the legacy controller performs as described herein.

In various embodiments, a BIOS driver may be present in an OS of target system 10. Such driver may operate at the OS level, and negotiate with a remote server or other remote source on availability of a BIOS or updates thereto, and request such code. The BIOS driver may also handle receipt and storage of the BIOS update in system memory 35, or other location. In such manner, new and/or updated settings and features can be patched to target system 10 and be effective immediately without restarting the system. For example, if a chipset setting was wrongly set in a current BIOS, a particular function such as a PCI posted write may be disabled. A BIOS update (i.e., to enable the PCI posted write) may be available in a remote server. An administrator of target system 10 can invoke the BIOS driver to obtain the relevant BIOS update from the remote server, and execute the update to enable PCI posted write operations, without restarting the system.

Optionally in certain embodiments, the system can be pre-configured to automatically update and execute BIOS updates. For example, the system may be pre-configured to request a latest BIOS version from a remote server after system reset. In such manner, a BIOS revision used in all systems within a network may be consistent. The BIOS driver can be configured to detect availability of BIOS updates, request the relevant BIOS update from the remote server, and execute the BIOS update automatically, without any user intervention. Alternately, the remote server may be configured to broadcast the update availability to every target that connects to the network.

As further shown in FIG. 1, a remote server 75 may be coupled to target system 10. Such a remote server may be a server computer, and may include an architecture well known to those of ordinary skill in the art. In various embodiments, remote server 75 may provide centralized storage for a BIOS database. Remote server 75 may be referred to as a BIOS server, reflecting that it is configured to receive and interpret system information from a target system and to negotiate with the target system for delivery of a suitable BIOS. Remote server 75 may include or may be coupled to a database, such as a storage system, that includes a plurality of different BIOS's. In one embodiment, such differently configured BIOS's may be stored with BIOS identifiers (IDs) such that as updates become available, they may be associated with their corresponding base BIOS.

Figure 2:
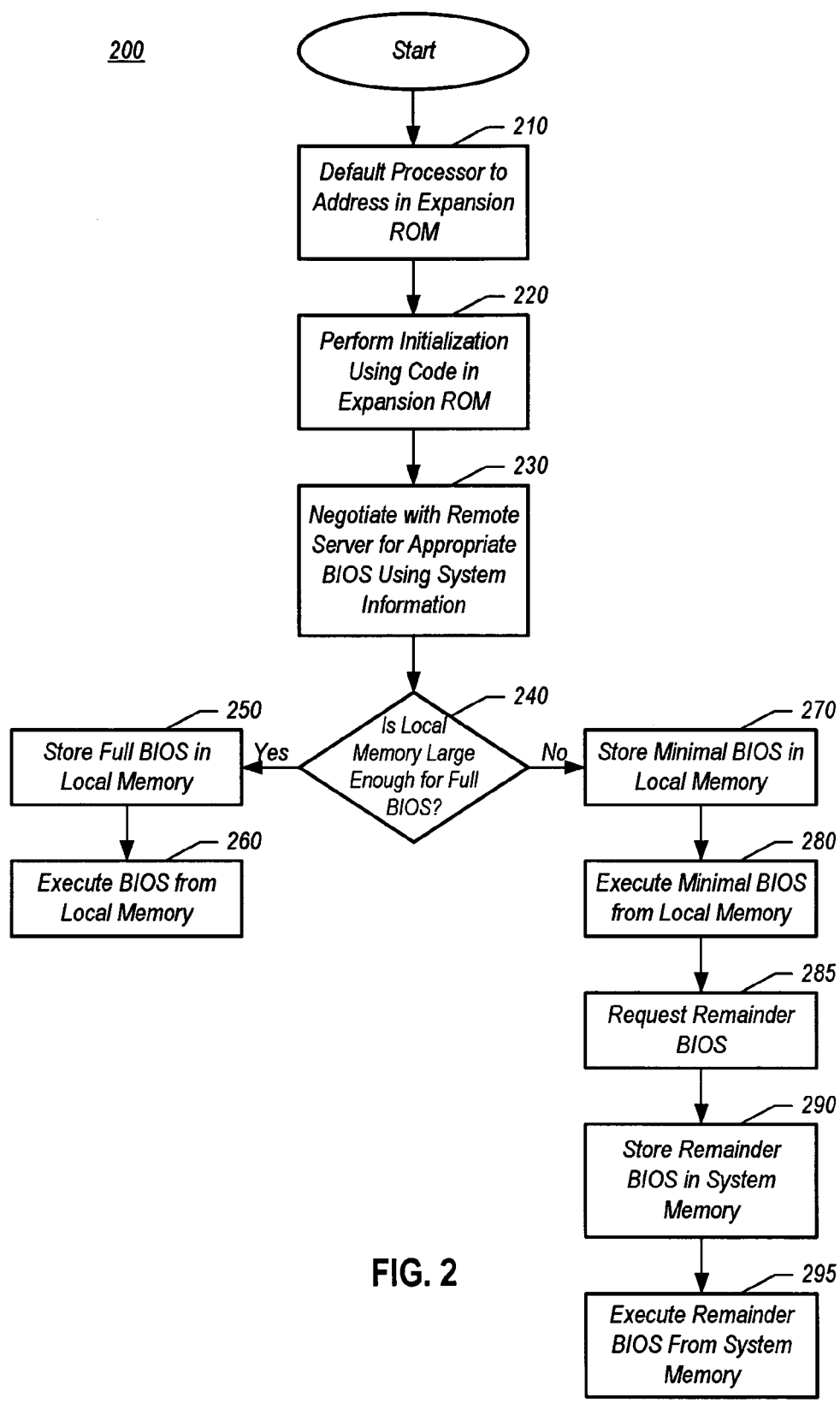
FIG. 2 is a flow diagram of a method in accordance with one embodiment of the present invention.

Referring now to FIG. 2, shown is a flow diagram of a method in accordance with one embodiment of the present invention. As shown in FIG. 2, method 200 may be used to obtain BIOS from a remote server to which a system, such as a PC, blade server or other such device that lacks an on-board BIOS, is coupled. Method 200 or another such embodiment may be implemented in code and may be stored on a storage medium having stored thereon instructions which can be used to program a computer system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs), erasable programmable read-only memories (EPROMs), flash memories, electrically erasable programmable read-only memories (EEPROMs), magnetic or optical cards, or any type of media suitable for storing electronic instructions. Example embodiments may be implemented in software for execution by a suitable computer system configured with a suitable combination of hardware devices, such as target system 10.

Still referring to FIG. 2, a processor of the system may be vectored or defaulted to an address location in an expansion ROM (block 210). Such an expansion ROM (or other nonvolatile memory of the system) may include code to minimally configure the system so that it may communicate with an external source (e.g., a remote server). Next, the minimal amount of initialization may be performed using the code in the expansion ROM (block 220).

Thus, with respect to target system 10 of FIG. 1, processor 20 may be set to jump to an address in expansion ROM 54 upon reset or restart. For example, in one embodiment, upon power-on or reset of target system 10, a memory space bit in the command register of network controller 52 and the expansion ROM base address enable bit may be set to one in accordance with the PCI Local Bus Specification Revision 3.0. In such manner, the expansion ROM base address (i.e., an upper 21 bits of the expansion ROM base address register) may be defaulted (at power-on and reset) to handle the base address and size information that covers a reset vector address of processor 20. For example, if the reset vector address is 0xFFFFFFF0, then the expansion ROM base address is defaulted to 0xFFFF0000 for a 64 kilobyte (KB) expansion ROM 54.

At the default address, expansion ROM 54 may contain an instruction located in address 0xFFFFFFF0 (i.e., the processor reset vector). This instruction may result in a jump to the initialization (INIT) function stored in expansion ROM 54. In certain embodiments, controller 52 may be connected at PCI bus location 0 in order for it to claim the CPU transaction immediately after power-on or reset. If network controller 52 is not connected at bus 0, a default (at power-on and reset) to the memory base and limit of the PCI bridge(s) at the upstream point to cover the expansion ROM base address of network controller 52 may be implemented.

In various embodiments, expansion ROM 54 may include code to perform various functions to be executed during the initialization routine. These functions may be performed from this code instead of an on-board BIOS in target system 10. The code may be executed to initialize a minimum amount of target system 10, namely peripheral device 50 and more specifically network controller 52 such that it may communicate with remote server 75 to obtain the desired and appropriate BIOS for target system 10. Thus target system 10 may negotiate with remote server 75 to obtain an appropriate BIOS, using system information (block 230). In certain embodiments, these few components may be all that are initialized. Even system memory 35 may not be initialized, in certain embodiments.

In one embodiment, expansion ROM 54 may store code to map local memory 56 as a peripheral memory, such as a PCI memory, that is located typically beyond the top of memory (TOM), so that it may be initialized and accessed while obtaining a BIOS from remote source 75. Furthermore, expansion ROM 54 may include code to copy a transmission control protocol/Internet protocol (TCP/IP) stack (which may be stored on expansion ROM 54) into local memory 56 for execution. Additionally, code may be present in expansion ROM 54 to read the system (e.g., board) information (e.g., circuit board information, such as CPU type, device IDs, vendor IDs, and the like), and to translate the system information into a proper format for transmission.

Still referring to FIG. 2, it may then be determined whether the local memory is large enough to receive a full BIOS download (diamond 240). If the local memory is large enough, the full BIOS may be stored in the local memory (block 250). For example, expansion ROM 54 may include code to store a received BIOS into local memory 56 and jump to the BIOS entry point in local memory 56 to start BIOS execution. Thus, if local memory 56 is large enough to contain a complete BIOS image, then the complete BIOS may be transmitted. Then, the full BIOS may be executed from the local memory (block 260). In such manner, the BIOS and any updates thereto may be immediately executed without resetting or restarting target system 10.

If instead it is determined at diamond 240 that the local memory is not large enough to receive a full download, a minimal BIOS portion may be stored in the local memory (block 270). This minimal BIOS may then be executed from local memory (block 280). The minimal BIOS execution may initialize system memory 35, and other system components.

Such execution may include generating a request for a remainder BIOS portion (block 285). The minimal BIOS may use the TCP/IP stack in local memory 56 to request the remainder BIOS segment from remote server 75. Upon receipt of such remainder BIOS code, it may be stored in another volatile memory of the system, for example, a system memory (block 290). Then, the remainder BIOS may be executed from system memory (block 295).

In such manner, a BIOS may be delivered to target system 10 that has desired functionality for system initialization and performance of low-level interface operations and the like. Furthermore, a BIOS delivered in accordance with an embodiment of the present invention may be unlimited in storage size, as it is not limited to a particular on-board ROM size. Furthermore, because remote server 75 may include or be associated with a database that includes many different BIOS configurations, a large number of different system configurations can be implemented using remote server 75. Also, because the delivered BIOS may be directly stored to an executable memory, such as local memory 56 or system memory 35, an update to an initially received BIOS (or the initial BIOS) can be executed at the OS level immediately without restarting the system.

Furthermore, because embodiments may store BIOS in a local memory or other system memory, no flash device is used to maintain an on-board BIOS, thus avoiding device failure and content corruption issues, permitting BIOS to be highly available through a network. Thus, without an on-board BIOS, the work and time required to update the BIOS in a flash within memory systems may be eliminated.

Thus in various embodiments, BIOS may be stored in a centralized server. With such a modular BIOS design and a large storage capacity, a remote server may support BIOS for different platforms under one or more source and binary trees. Further in certain embodiments, a target and server can negotiate dynamically for BIOS modules, anytime during power on self test (POST) and/or OS execution.

Because BIOS may be stored in a centralized server, a one-stop BIOS manageability location for an inter-networking system may be provided. In a telecommunications environment, for example, there may be thousands of blade servers installed in the field worldwide. In such a telecommunications environment, every second of operation is extremely valuable when a blade server is up and running, as even down time of several minutes every few years is undesirable. In various embodiments, such a system may continue to provide service while at the same time executing new and/or updated settings and/or features from a BIOS update, avoiding downtime caused by system restarts.

The ability to access different BIOS's in one central location may significantly reduce logistic expenses. For example, BIOS debugging and development can be done remotely at a remote server or other location.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
    a network controller to request a basic input/output system (BIOS) from a remote source if the network controller is within a system that does not include an on-board BIOS;
    a local memory dedicated to the network controller to store at least a portion of the BIOS, the local memory comprising a volatile memory; and
    said controller to request a BIOS update from said remote source and to enable execution of said update without restarting said apparatus.

2. The apparatus of claim 1, further comprising a BIOS driver to negotiate with the remote source regarding availability of the BIOS or an update to the BIOS for the system.

3. The apparatus of claim 1, further comprising an expansion read only memory (ROM) coupled to the local memory, the expansion ROM including non-BIOS code to initialize the network controller.

4. The apparatus of claim 3, wherein the expansion ROM includes code to map the local memory as a peripheral memory.

5. The apparatus of claim 1, further comprising a system memory to store a remainder BIOS code segment, wherein the portion of the BIOS to be stored in the local memory comprises an initial BIOS code segment.

6. A system comprising:
    a network controller to request a basic input/output system (BIOS) and a BIOS update from a remote source if the network controller is within a system that does not include an on-board BIOS and said controller to enable execution of said update without restarting said system;
    a local memory dedicated to the network controller to store at least a portion of the BIOS, the local memory comprising a volatile memory; and
    a dynamic random access memory coupled to the network controller.

7. The system of claim 6, further comprising an expansion read only memory (ROM) coupled to the local memory, the expansion ROM including non-BIOS code to initialize the network controller.

8. The system of claim 7, further comprising a processor to vector to the expansion ROM upon boot of the system.

9. The system of claim 6, wherein the dynamic random access memory to store a remainder BIOS code segment, wherein the portion of the BIOS to be stored in the local memory comprises an initial BIOS code segment.

10. The system of claim 6, wherein the remote source comprises a server including a plurality of different basic input/output systems (BIOS's).

11. An article comprising a machine-accessible storage medium containing instructions that if executed enable a system to:
    initialize the system without a basic input/output system (BIOS) to vector to a memory dedicated to a network controller;
    request a BIOS and a BIOS update from a remote source using code stored in the memory;
    store the BIOS and BIOS update in a volatile memory of the system; and
    execute said BIOS update without restarting said system.

12. The article of claim 11, further comprising instructions that if executed enable the system to:
    receive the request from the system, the request including information regarding the system;
    determine an appropriate BIOS for the system based on the information; and
    transmit the appropriate BIOS to the system.

13. The article of claim 11, further comprising instructions that if executed enable the system to request a BIOS update via the BIOS.

14. The article of claim 13, further comprising instructions that if executed enable the system to receive the BIOS update at the system and execute the BIOS update without restarting the system.

15. The article of claim 11, further comprising instructions that if executed enable the system to store an initial BIOS code in the volatile memory, and store a remainder BIOS code in a system memory.

* * * * *